United States Patent [19]

Adachi et al.

[11] Patent Number: 5,179,519
[45] Date of Patent: Jan. 12, 1993

[54] NAVIGATION SYSTEM FOR VEHICLE

[75] Inventors: Masaya Adachi; Hayato Yoshida; Hitoshi Ando; Tsutomu Honda; Isao Endo, all of Saitama, Japan

[73] Assignee: Pioneer Electronic Corporation, Tokyo, Japan

[21] Appl. No.: 645,443

[22] Filed: Jan. 24, 1991

[30] Foreign Application Priority Data

Feb. 1, 1990 [JP] Japan .................................. 2-23338
Mar. 15, 1990 [JP] Japan .................................. 2-62631

[51] Int. Cl.⁵ .......................................... G06F 15/50
[52] U.S. Cl. ................................ 364/449; 73/178 R; 340/990; 340/995; 342/357
[58] Field of Search ............... 364/443, 444, 449, 450, 364/454, 457, 460; 342/357, 451, 457; 33/356, 357; 340/988, 990, 995; 73/178 R

[56] References Cited

U.S. PATENT DOCUMENTS

| | | | |
|---|---|---|---|
| 4,743,913 | 5/1988 | Takai | 342/357 |
| 4,890,233 | 12/1989 | Ando et al. | 340/995 |
| 4,899,285 | 2/1990 | Nakayama et al. | 364/449 |
| 4,903,212 | 2/1990 | Yokouchi et al. | 364/460 |
| 4,949,268 | 8/1990 | Nishikawa et al. | 364/450 |
| 5,075,693 | 12/1991 | McMillan et al. | 364/454 |

Primary Examiner—Gary Chin
Attorney, Agent, or Firm—Sughrue, Mion, Zinn, Macpeak & Seas

[57] ABSTRACT

A navigation system for a vehicle which does not bewilder a driver of the vehicle with heading indication also when the driving speed of the vehicle is low. The navigation system comprises a GPS receiver, a display unit, a map memory in which a map is stored, a detecting section for detecting a driving position and a driving direction of the vehicle from information received from the GPS receiver, and a controller. The controller receives information of a driving speed of the vehicle from the vehicle and controls, when the driving speed is equal to or higher than a preset speed, the display unit to indicate on a display screen thereof the driving position and driving direction of the vehicle received from the detecting section together with the map received from the map memory, but controls, when the driving speed is lower than the preset speed, the display unit to indicate only the driving position of the vehicle received from the detecting section together with the map received from the map memory.

9 Claims, 6 Drawing Sheets

NAVIGATION SYSTEM FOR VEHICLE

BACKGROUND OF THE INVENTION

1. Field of the Invention

This invention relates to a navigation system for a vehicle wherein a current driving position and a current driving direction of the vehicle are indicated on a display screen of a display unit making use of the global positioning system (GPS).

2. Description of the Prior Art

A conventional navigation system for a vehicle based on satellite navigation of the type mentioned normally involves position indication for indicating a current driving position of the vehicle in accordance with information received from a GPS receiver and heading indication for indicating a current driving direction of the vehicle.

In particular, a map around a point at which the vehicle currently drives is normally displayed on a display screen of a CRT (cathode ray tube) display unit located adjacent the driver's seat of the vehicle, and a suitable mark such as, for example, a round mark is indicated on the map to effect position indication while a small figure or graphic pattern of the vehicle is drawn, for example, at a right upper corner of the display screen to effect heading indication.

With such conventional navigation system for a vehicle, however, since a driving direction of the vehicle is calculated from information received from a GPS receiver, when the driving speed of the vehicle (hereinafter referred to merely as driving speed) is low such as, for example, 4 km/h to 5 km/h, the error in direction calculation is so great that a significant error may take place in heading indication, which will cause the driver to be bewildered or get lost.

A navigation system is also known wherein a direction to a destination is additionally indicated on the CRT screen. Referring to FIG. 8, there is shown an exemplary one of display screens of conventional navigation systems for a vehicle of the type just mentioned. The display screen 9a shown has a map 19 displayed thereon. A destination mark 21 in the form of a dot indicating a destination of the vehicle, a current position mark 22 in the form of a dot indicating a current position of the vehicle, a direction marker 23 in the form of a blank arrow mark indicating a direction to the destination 21 when the destination 21 is viewed from the current position 22, and a driving direction marker 24 in the form of a blank arrow mark indicating a direction in which the vehicle is currently driving or directed, are indicated on the map 19 displayed on the display screen 9a.

When the map 19, destination 21, current position 22, destination direction marker 23 and driving direction mark 24 are displayed on the display screen 9a in this manner, the driver can reach the destination 21 by driving the vehicle such that the driving direction marker 24 may coincide with the destination direction marker 23.

With such conventional navigation system for a vehicle as described above, as the vehicle drives, the orientation of the driving direction marker 24 is successively varied to various directions while the orientation of the destination direction marker 23 is also varied. Consequently, it cannot be discerned intuitively in what direction the destination 21 is positioned with respect to the driving direction of the vehicle. Accordingly, the navigation system is inferior in convenience in use in that point.

SUMMARY OF THE INVENTION

It is an object of the present invention to provide a navigation system for a vehicle which does not bewilder a driver of the vehicle with heading indication also when the driving speed of the vehicle is low.

It is another object of the present invention to provide a navigation system for a vehicle with which a driver can intuitively discern in what direction a destination is positioned with respect to the current driving direction of the vehicle.

In order to attain the objects, according to the present invention, there is provided a navigation system for a vehicle, comprising a GPS receiver, a display unit having a display screen, map storage means in which a map to be displayed on the display screen is stored, detecting means for detecting a driving position and a driving direction of the vehicle from information received from the GPS receiver, and controlling means for receiving information of a driving speed of the vehicle from the vehicle and controlling, when the driving speed is equal to or higher than a preset speed, the display unit to indicate on the display screen the driving position and driving direction of the vehicle received from the detecting means together with the map received from the map storage means but controlling, when the driving speed is lower than the preset speed, the display unit to indicate on the display screen only the driving position of the vehicle received from the detecting means together with the map received from the map storage means.

Preferably, the controlling means controls, when the driving speed of the vehicle is lower than the preset speed, the display unit to indicate on the display screen not the driving direction of the vehicle based on information received from the GPS receiver but a driving direction based on last information which has been received last from the GPS receiver while the driving speed of the vehicle was equal to or higher than the preset speed.

The navigation system may further comprise a geomagnetic sensor or/and a gyro, and the controlling means may control, when the driving speed of the vehicle is lower than the preset speed, the display unit to indicate on the display screen not the driving direction based on information received from the GPS receiver but a driving direction based in information received from the geomagnetic sensor or/and the gyro. In this instance, the controlling means may control, when the driving speed of the vehicle is lower than the preset speed, the display unit to indicate on the display screen only the driving position of the vehicle based on information received from the GPS receiver together with the map received from the map storage means if the error between direction information received from the GPS receiver and direction information received from the geomagnetic sensor or/and the gyro is greater than a predetermined value.

With the navigation system for a vehicle, when the driving speed is lower than the preset speed, the driving position of the vehicle is indicated on the display screen of the display unit based on information received from the GPS receiver, or the driving direction is indicated on the display screen either based on last information which has been received last from the GPS receiver while the driving speed was equal to or higher than the preset speed or based on information received from the geomagnetic sensor or/and the gyro.

On the contrary, when the driving speed is lower than the preset speed, only the driving position is displayed based on information received from the GPS receiver if the error between direction information received from the GPS receiver and direction information received from the geomagnetic sensor or/and the gyro is greater than the predetermined value.

Accordingly, when the driving speed is lower than the preset speed, while the driving position is indicated on the display screen of the display unit, the driving direction is indicated either based on last direction information obtained during driving of the vehicle at a higher speed than the preset speed or based on direction information received from the geomagnetic sensor or/and the gyro. Consequently, even when the driving speed of the vehicle is low, the driver will not be bewildered by any indication of the driving direction of the vehicle.

Preferably, the navigation system further comprises means for inputting a destination to the controlling means, and the controlling means controls the display unit to indicate on the display screen a destination direction in which the destination position is viewed from the driving position detected by the detecting means together with the driving direction detected by the detecting means and the map received from the map storage means, the destination direction and the driving direction being indicated by graphic patterns having a directivity at a common reference point such that one of the graphic patterns is displayed in an upwardly directed condition on the display screen while the other graphic pattern is displayed in an inclined relationship with respect to the one graphic pattern by an angle equal to the angle between the destination direction and the driving direction. Thus, if the driver observes the graphic patterns of the destination direction and the driving direction of the vehicle displayed on the display screen of the display unit, then it can be intuitively discerned in what direction the destination is positioned with respect to the driving direction. Accordingly, the navigation system is superior in convenience in use.

The above and other objects, features and advantages of the present invention will become apparent from the following description and the appended claims, taken in conjunction with the accompanying drawings.

DESCRIPTION OF THE PREFERRED EMBODIMENTS

Figure 1:
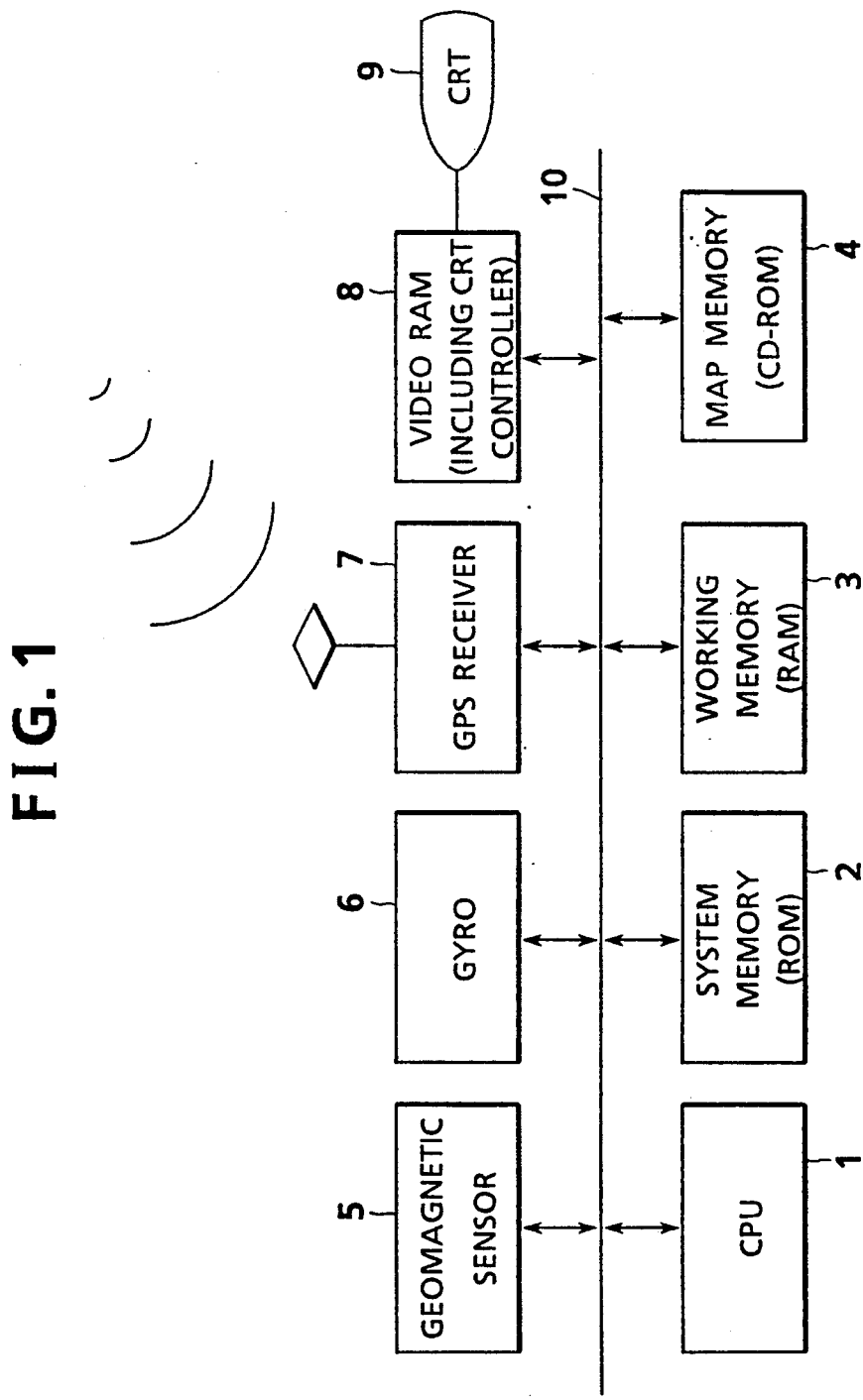
FIG. 1 is a block diagram of a navigation system for a vehicle showing a preferred embodiment of the present invention.

Referring first to FIG. 1, there is shown in block diagram a navigation system for a vehicle to which the present invention is applied. The navigation system includes a microcomputer for controlling operation of the entire system. The microcomputer includes a central processing unit (CPU) 1, a system memory 2 in the form of a read only memory (ROM) and a working memory 3 in the form of a random access memory (RAM).

The microcomputer further includes a system bus 10 to which the CPU 1, system memory 2 and working memory 3 are connected. Also connected to the system bus 10 are a map memory 4 in the form of a CD-ROM (compact disk ROM), a geomagnetic sensor 5, a gyro 6, a GPS receiver 7, a video RAM 8, various sensors for detecting various conditions of the vehicle including a car speed pulse generator not shown and a steering angle sensor not shown, and an operating section not shown which may be a keyboard including ten keys, several function keys, a touch panel and so forth by way of which data are to be inputted to the microcomputer.

The map memory 4 has stored in advance therein information of various maps necessary for the guidance of driving of the vehicle and outputs, in response to an instruction from the microcomputer, data of a suitably edited map to the video RAM 8.

The geomagnetic sensor 5 detects terrestrial magnetism at a current position of the vehicle during driving, and terrestrial magnetism thus detected is used in order to allow heading indication when heading indication cannot be effected in accordance with information from the GPS receiver 7 as hereinafter described.

The gyro 6 detects a driving direction of the vehicle making use of inertia as well known in the art. The driving direction thus detected is stored into the working memory 3 and is used in order to allow heading indication when heading indication cannot be effected in accordance with information from the GPS receiver 7 as hereinafter described.

The GPS receiver 7 receives, as well known in the art, from a plurality of artificial satellites radio waves from which a current position, a driving direction and so forth of the vehicle are calculated. In order to detect the current position of the vehicle, it is necessary for the GPS receiver 7 to receive radio waves from at least three artificial satellites. Generally, such GPS receiver 7 is low in accuracy when the driving speed of the vehicle is low.

The video RAM 8 serves as a buffer memory for storing therein data for a display image to be displayed on a display screen of the CRT display unit 9 and has a CRT controller (not shown) built therein which has a digital to analog converting function of a video signal. Thus, image data stored in the video RAM 8 are transmitted, by way of the CRT controller, to the CRT display unit 9 so that a map is displayed on a display screen 9a of the CRT display unit 9.

Figure 3:
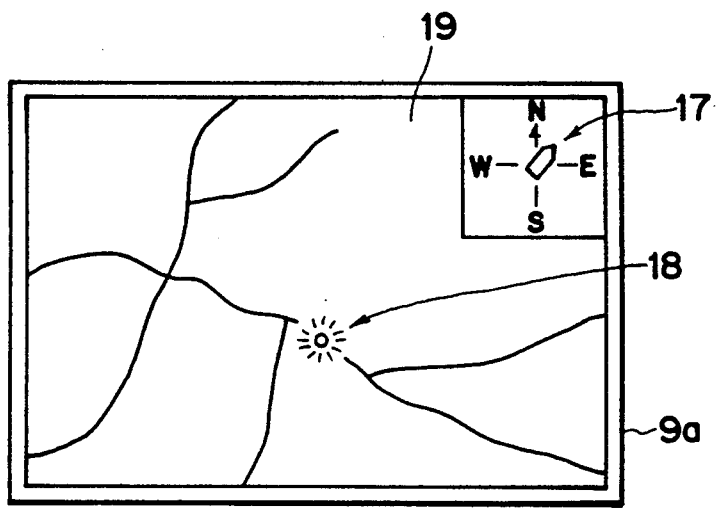
FIGS. 3 and 4 are illustrations showing exemplary display images displayed on a display screen of the navigation system of FIG. 1.
Figure 4:
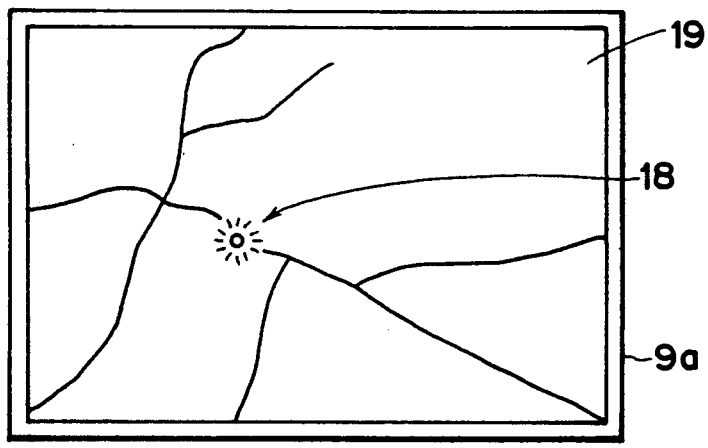

Referring to FIGS. 3 and 4, there are shown exemplary display images displayed on the display screen 9a of the CRT display unit 9 of the navigation system described above. The display image shown in FIG. 3 includes a heading indication 17 in the form of a small graphic pattern or figure of a vehicle provided at a right upper corner area of the display screen 9a, and a position indication 18 in the form of a bright graphic pattern or figure of a round dot or small circle provided on a map 19 displayed in the other area of the display screen 9a than the right upper corner area. On the other hand, the display image shown in FIG. 4 only includes a position indication 18 on a map 19 displayed in the entire area of the display screen 9a.

Figure 2:
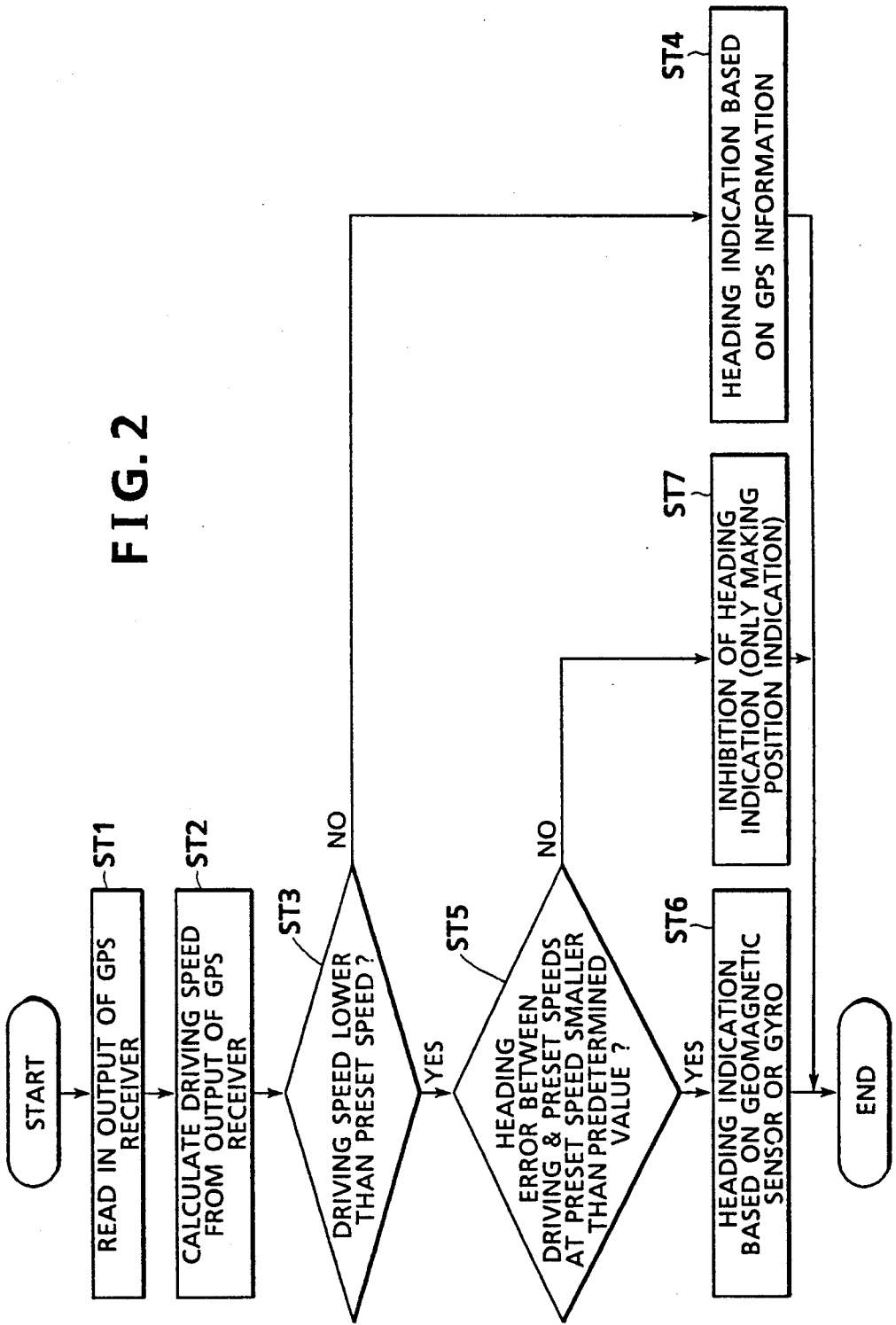
FIG. 2 is a flow chart illustrating operation of the navigation system of FIG. 1.

The navigation system operates in such a manner as illustrated in the flow chart of FIG. 2. Referring to FIG. 2, after control is started in accordance with a program stored in the system memory 2, the CPU 1 of the microcomputer first reads in, at step ST1, output data of the GPS receiver 7 and then calculates, at step ST2, a driving speed of the vehicle from the thus read in data in accordance with a known technique. Then at step ST3, the CPU 1 judges whether or not the driving speed thus calculated is lower than a preset speed such as, for example, 5 km/h.

Here, since the accuracy of direction information based on information from the GPS receiver 8 drops significantly when the driving speed of the vehicle drops to a low level, the accuracy of direction information is determined from a driving speed.

If it is judged at step ST3 that the driving speed is equal to or higher than the present speed, then at subsequent step ST4, a heading indication 17 is provided in the form of a display pattern or figure of a vehicle at such a right upper corner area of the display screen 9a of the CRT 9 as described hereinabove while a position indication 18 is provided in the form of a bright round point or mark on the map displayed at a position of the remaining area of the display screen 9a corresponding to the current position of the vehicle as seen in FIG. 3.

It is to be noted that the driving point of the vehicle is calculated, similarly as in calculation of a driving speed, in accordance with a known technique from data received from the GPS receiver 7.

On the contrary if it is judged at step ST3 that the driving speed of the vehicle is lower than the preset speed, then it is judged subsequently at step ST5 whether or not the heading error between direction information based on information of the GPS receiver 7 at the preset speed and direction information based on direction information of the gyro 6 is smaller than a predetermined value.

Here, it is judged whether the direction information of the geomagnetic sensor 5 or the direction information of the gyro 6 is reliable.

Then, if it is judged at step ST5 that the heading error is smaller than the predetermined value, then a heading indication 17 and a position indication 18 are provided, at step ST6, on the display screen 9a of the CRT 9 as shown in FIG. 3 using the direction information of the geomagnetic sensor 5 or gyro 6 and the position information of the GPS receiver 7.

On the contrary, if it is judged at step ST5 that the heading error is equal to or greater than the predetermined value, then this means that the direction information of neither the geomagnetic sensor 5 nor the gyro 6 is reliable, and accordingly, at subsequent step ST7, only a position indication 18 is provided on the display screen of the CRT 9 as shown in FIG. 4 using the position information of the GPS receiver 7.

As described above, according to the navigation system for a vehicle of the embodiment described above, if the driving speed based on information received from the GPS receiver 7 is lower than the preset speed, then a position indication 18 is provided while a heading indication 17 based on direction information received from the GPS receiver 7 is not provided. Then, such heading indication 17 is provided based on direction information from the geomagnetic sensor 5 or gyro 6 on condition that the reliability of direction information from the geomagnetic sensor 5 or gyro 6 is sufficiently high. Accordingly, even when the driving speed of the vehicle is low, the driver is bewildered by a heading indication 17.

It is to be noted that, while a driving speed of the vehicle in the embodiment described above is calculated in accordance with information obtained from the GPS receiver 7, it may otherwise be obtained from a car speed pulse generator or a speedometer.

Further, while a heading indication 17 based on direction information obtained from the GPS receiver 7 is not provided when the driving speed of the vehicle is lower than a preset speed, direction guide can be achieved to some degree if a heading information 10 is provided based on direction information of the geomagnetic sensor 5 or gyro 6.

Alternatively, if a heading indication 17 when the driving speed of the vehicle is lower than a preset speed is provided based on last direction information of the GPS receiver 7 when the driving speed is equal to or higher than the preset speed, then direction guide can be achieved to some degree without the geomagnetic sensor 5 or/and the gyro 6.

Also, a heading indication 10 may be provided at step ST6 based on direction information either from the geomagnetic sensor 5 or from the gyro 6 depending upon the priority determined in advance.

Figure 5:
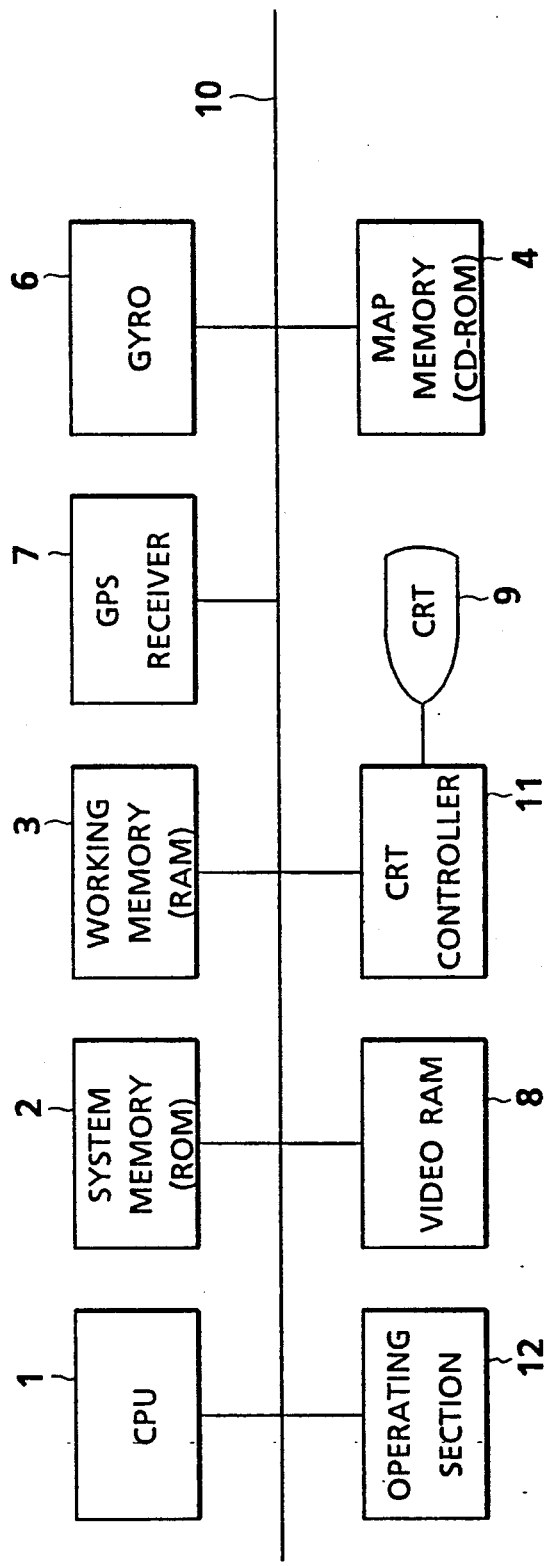
FIG. 5 is a block diagram of another navigation system for a vehicle showing another preferred embodiment of the present invention.

Referring now to FIG. 5, there is shown a navigation system for a vehicle according to a second preferred embodiment of the present invention. The navigation system is somewhat similar in construction to but different from the navigation system of the preceding embodiment shown in FIG. 1 in that it does not include such geomagnetic sensor 5 as in the preceding embodiment. Naturally, however, the present navigation system may otherwise include such geomagnetic sensor. It is to be noted here that, in FIG. 5, the navigation system is shown including a CRT controller 11 separate from the video RAM 8 while such CRT controller is included in the video RAM 8 in the navigation system shown in FIG. 1, and also including an operating section 12 while such operating section is not shown with the navigation system of FIG. 1.

Figure 7:
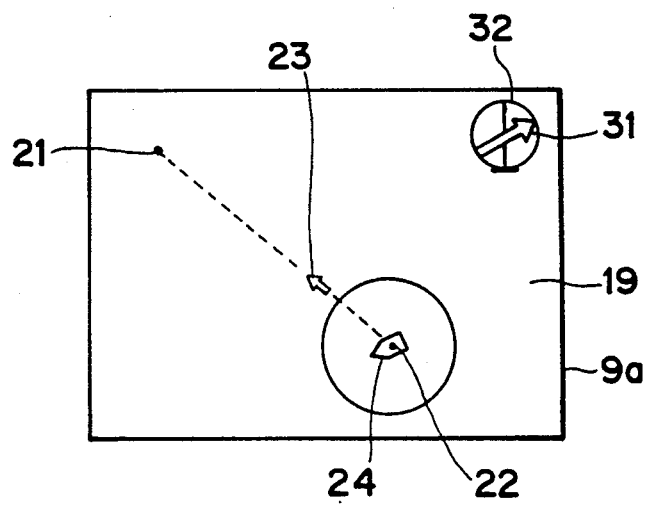
FIG. 7 is an illustration showing an exemplary display image displayed on a display screen of the navigation system of FIG. 5.
Figure 8:
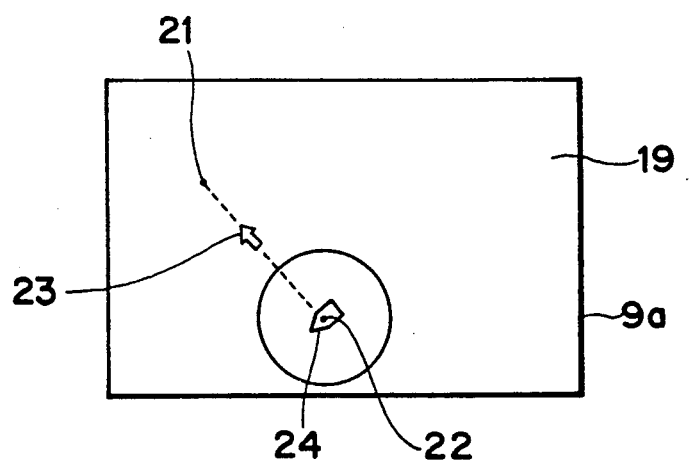
FIG. 8 is a similar view but showing an exemplary display image displayed on a display screen of a conventional navigation system for a vehicle.

Referring now to FIG. 7, there is shown an exemplary display image displayed on the display screen 9a of the CRT display unit 9 of the navigation system of FIG. 5. The display image shown includes a destination direction marker 31 in the form of a blank arrow mark indicating a destination direction in which a destination 21 is viewed from a current position 22 of the vehicle, and a driving direction marker 32 in the form of a blank arrow mark indicating a driving direction of the vehicle. The destination direction marker 31 and the driving direction marker 32 are displayed with respect to the origin common to them in a window area provided adjacent the right upper corner of the display screen 9a such that the driving direction marker 32 is directed upwardly while the destination direction marker 31 is displayed in an inclined relationship with respect to the driving direction marker 32 by an angle equal to the angle between the destination direction and the driving direction.

Figure 6:
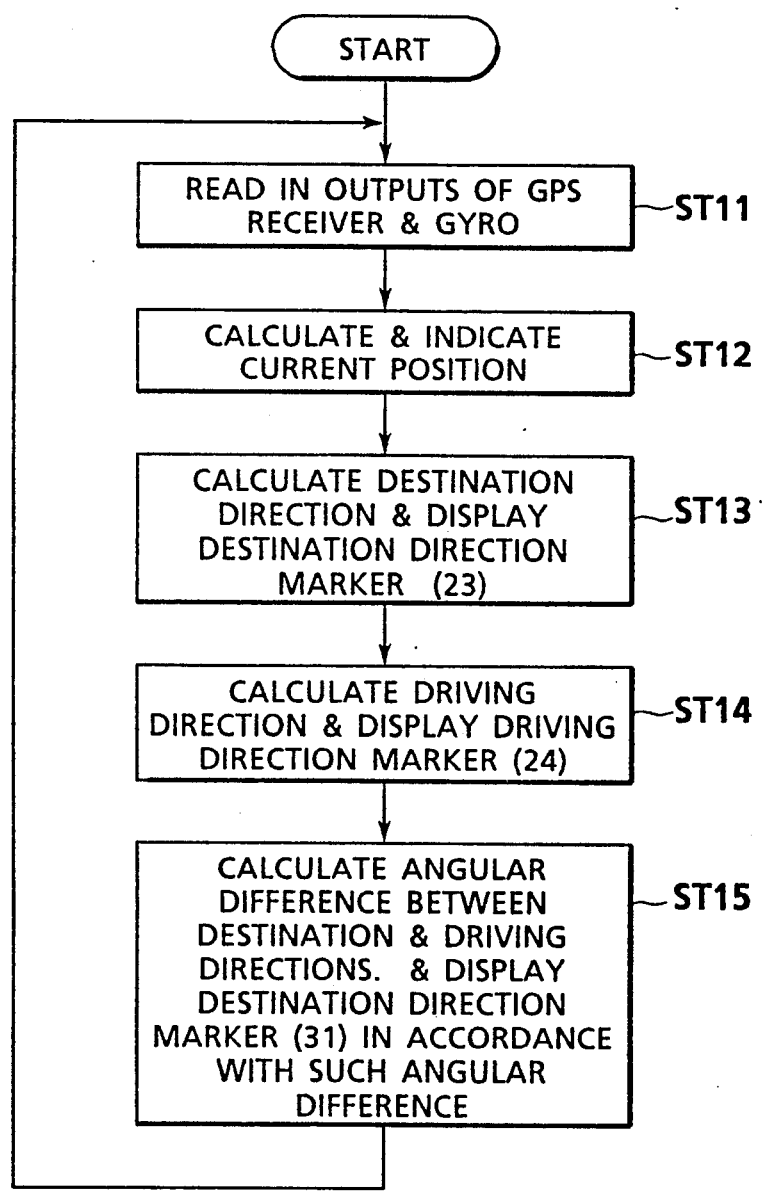
FIG. 6 is a flow chart illustrating operation of the navigation system of FIG. 5.

The navigation system of FIG. 5 operates in accordance with the flow chart illustrated in FIG. 6. Referring now to FIG. 6, after the routine shown is started while a map 19, a destination position 21, the destination direction markers 23 and 31 and the driving direction marker 32 are displayed on the display screen 9a of the CRT display unit 9, output data of the GPS receiver 7 and gyro 6 are read in first at step ST11, and then a current driving position 22 of the vehicle is calculated from the data thus read in from the GPS receiver 7 and is displayed on the display screen 9a at step ST12.

Then at step ST13, a destination direction is calculated from data of the destination position 21 set in advance by way of the operating section 12 and the destination direction marker 23 is displayed at an appropriate position on the display screen 9a.

Subsequently at step ST14, a driving direction of the vehicle is calculated from the data read in from the GPS receiver 7 or gyro 6 and the driving direction marker 24 is displayed at an appropriate position on the display screen 9a.

Finally at step ST15, a directional or angular difference of the destination direction from the driving direction is calculated from the data of the destination direction and the data of the driving direction calculated at steps ST13 and ST14, respectively, and the destination direction marker 31 is displayed in accordance with the thus calculated angular difference.

After completion of the processing at step ST15, the control sequence retruns to step ST11 to repeat similar processing.

Accordingly, with the navigation system of the present embodiment, since the relationship of a destination direction to a driving direction of the vehicle can be seen from the destination direction marker 31 and driving direction marker 32 which are displayed such that the destination direction marker 31 is inclined leftwardly or rightwardly with respect to the driving direction marker 32 at an angle equal to the angular difference between the destination direction and the driving direction of the vehicle, when the driver looks at the destination direction marker 31 and driving direction marker 32 on the display screen 9a of the CRT display unit 9, it can be intuitively discerned in what direction the destination is positioned with respect to the driving direction of the vehicle. Accordingly, the navigation system is superior in convenience in use.

It is to be noted that, while the driving direction marker 32 indicating a current driving direction of the vehicle is displayed in an upwardly directed condition on the display screen 9a of the CRT display unit 9 in the second embodiment described above, the destination direction marker 31 indicating a direction to the destination may alternatively be displayed in an upwardely directed condition on the display screen 9a.

Further, while a graphic pattern or figure in the form of an arrow mark is employed as a graphic pattern having a directivity, any other graphic pattern such as a vector pattern or a triangle having a directivity may otherwise be employed.

Having now fully described the invention, it will be apparent to one of ordinary skill in the art that many changes and modifications can be made thereto without departing from the spirit and scope of the invention as set forth herein.

What is claimed is:

1. A navigation system for a vehicle, comprising a GPS receiver, a display unit having a display screen, map storage means in which a map to be displayed on said display screen is stored, detecting means for detecting a driving position and a driving direction of said vehicle from information received from said GPS receiver, and controlling means for receiving information of a driving speed of said vehicle from said vehicle and controlling, when the driving speed is equal to or higher than a preset speed, said display unit to indicate on said display screen the driving position and driving direction of said vehicle received from said detecting means together with the map received from said map storage means but controlling, when the driving speed is lower than the preset speed, said display unit to indicate on said display screen only the driving position of said vehicle received from said detecting means together with the map received from said map storage means.

2. A navigation system as claimed in claim 1, wherein said controlling means controls, when the driving speed of said vehicle is lower than the preset speed, said display unit to indicate on said display screen a driving direction based on last information which has been received last from said GPS receiver while the driving speed of said vehicle was equal to or higher than the preset speed.

3. A navigation system as claimed in claim 1, further comprising a geomagnetic sensor and a gyro, and wherein said controlling means controls, when the driving speed of said vehicle is lower than the preset speed, said display unit to indicate on said display screen a driving direction based in information received from said geomagnetic sensor and said gyro.

4. A navigation system as claimed in claim 3, wherein said controlling means controls, when the driving speed of said vehicle is lower than the preset speed, said display unit to indicate on said display screen only the driving position of said vehicle based on information received from said GPS receiver together with the map received from said map storage means if the error between direction information received from said geomagnetic sensor and said gyro is greater than a predetermined value.

5. A navigation system as claimed in claim 1, further comprising means for inputting a destination to said controlling means, and wherein said controlling means controls said display unit to indicate on said display screen a destination direction in which a destination position is viewed from the driving position detected by said detecting means together with the driving direction detected by said detecting means and the map received from said map storage means, the destination direction and the driving direction being indicated by graphic patterns having a directivity at a common reference point such that one of the graphic patterns is displayed in an upwardly directed condition on said display sceen while the other graphic pattern is displayed in an inclined relationship with respect to the one graphic pattern by an angle equal to the angle between the destination direction and the driving direction.

6. A navigation system as claimed in claim 1, further comprising a geomagnetic sensor, and wherein said controlling means controls, when the driving speed of said vehicle is lower than the preset speed, said display unit to indicate on said display screen a driving direction based on information received from said geomagnetic sensor.

7. A navigation system as claimed in claim 1, further comprising a gyro, and wherein said controlling means controls, when the driving speed of said vehicle is lower than the preset speed, said display unit to indicate on said display screen a driving direction based on information received from said gyro.

8. A navigation system as claimed in claim 6, wherein said controlling means controls, when the driving speed of said vehicle is lower than the preset speed, said display unit to indicate on said display screen only the driving position of said vehicle based on information received from said GPS receiver together with the map received from said map storage means if the error between direction information received from said GPS receiver and direction information received from said geomagnetic sensor is greater than a predetermined value.

9. A navigation system as claimed in claim 7, wherein said controlling means controls, when the driving speed of said vehicle is lower than the preset speed, said display unit to indicate on said display screen only the driving position of said vehicle based on information received from said GPS receiver together with the map received from said map storage means if the error between direction information received from said GPS receiver and direction information received from said gyro is greater than a predetermined value.

* * * * *